C. SPRING.
Spoke-Shave.

No. 213,257.        Patented Mar. 11, 1879.

Witnesses.
L. F. Connor.
N. E. Whitney.

Inventor.
Charles Spring
by Crosby Gregory Attys

UNITED STATES PATENT OFFICE.

CHARLES SPRING, OF HYDE PARK, MASSACHUSETTS.

IMPROVEMENT IN SPOKE-SHAVES.

Specification forming part of Letters Patent No. 213,257, dated March 11, 1879; application filed December 14, 1878.

*To all whom it may concern:*

Be it known that I, CHARLES SPRING, of Hyde Park, county of Norfolk, State of Massachusetts, have invented an Improvement in Spoke-Shaves, of which the following description, in connection with the accompanying drawings, is a specification.

This invention relates to an improved drawing-knife or shave, it consisting, essentially, of a blade having one or both of its ends shaped to bear at one side of the blade against a seat made upon a handle, and to co-operate with shoulders or projections upon the handle, both when the handle extends from the blade at substantially a right angle from its cutting-edge, as shown in full lines in the accompanying drawings, and also when the handle extends in the direction of the length of the blade, as shown in dotted lines, the said handle and blade in each of its two positions being locked and held by a locking device.

Figure 1:
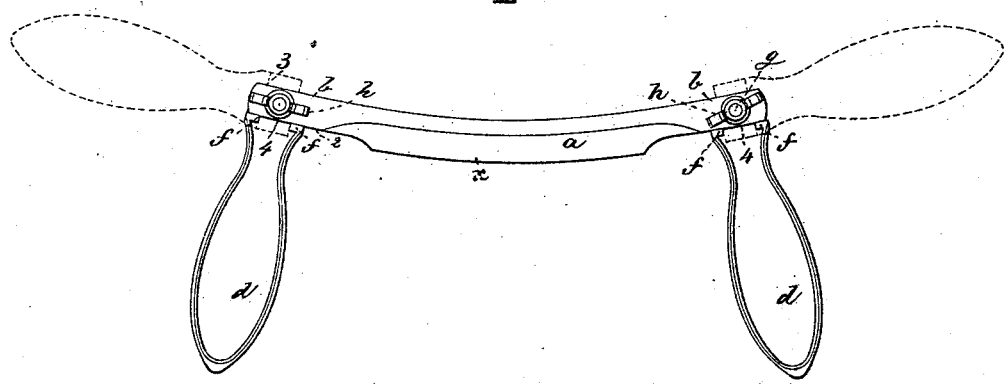
Figure 2:
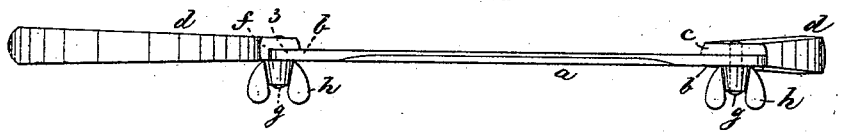
Figure 3:
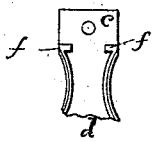

Figure 1 represents, in side elevation, a drawing-knife, constructed in accordance with this invention; Fig. 2, a top view thereof, the left-hand handle being turned to project in the direction of the length of the blade; and Fig. 3, a detail of the upper end of the handle.

The blade $a$, as herein shown, has its ends $b\ b$ flattened at its rear side to bear against a flattened portion, $c$, of the handle $d$, while the edges 2 3 of the blade, as shown in Fig. 1, are made straight, to bear the edge 2 against the lugs $f f$, as shown in Fig. 1, when the handle extends from the blade, as represented in full lines, or from the blade in the direction of its width.

The handles herein shown are supposed to be of metal; but their lower portions, or the parts grasped by the hand, may be of wood, if preferred, and screws $g$, projecting from the upper ends of the handle at right angles to their length, are extended through holes in the blade, and a nut, $h$, is then applied to each screw, to securely clamp each end of the blade to each handle.

By employing two lugs, $f f$, instead of one long rib or shoulder, extended from one to the other side of the handle, a space, 4, is left between the lugs, into which (the nut $h$ being loosened, so as to permit the blade and handle to be somewhat separated) when the handle is turned to occupy the position shown in dotted lines, Fig. 1, or in full lines at the left of Fig. 2, the end of the blade may enter, its edges 2 3 falling into the space 4 between the lugs $f f$, which, as the nut is again turned to press the rear side of the blade against the seat portion $c$, at the upper end of the handle, causes the lugs $f f$ to act with the screw and nut, and grasp and hold the handle and blade, so that the handle will project therefrom substantially in the direction of its length.

One or both of the handles may be held, as in full or dotted lines, Fig. 1, according to the particular work being done with the knife, or whether the workman is right or left handed.

A drawing-knife with the handle as in dotted lines may easily be used to hew or chip a piece of wood.

It is herein assumed that the handle of a drawing-knife has been fitted to a rounded end of a blade, so as to turn thereon, and project from the blade at right angles to its edge or face or back, the handle in such plan turning on an axis parallel with the length of the blade rather than at right angles thereon, as herein provided for.

It is obvious the screw might be attached to the blade, and be made to project through an opening in the handle; but this plan is not liked as well as its converse. (Shown in Fig. 1.)

The handles, constructed as shown, may be turned just opposite the full-line position of Fig. 1, and then the blade may be pushed with its cutting-edge $x$ in advance.

I denominate the screw and nut as "holding devices."

I claim—

As an improved article of manufacture, a drawing-knife composed of a blade and a movable handle, provided with a seat portion, $c$, and bearings or lugs $f f$, to confine the flattened ends of the blade when the handle projects from the blade in the direction of its width or in the direction of its length, substantially as described.

In testimony whereof I have signed my name to this specification in the presence of two subscribing witnesses.

CHARLES SPRING.

Witnesses:
G. W. GREGORY,
N. E. WHITNEY.